United States Patent [19]

Jones et al.

[11] Patent Number: 4,889,701
[45] Date of Patent: * Dec. 26, 1989

[54] PROCESS FOR OXIDIZING MULTIVALENT METALS

[75] Inventors: Timothy A. Jones, Carrollton; Earl S. Snavely, Jr., Arlington, both of Tex.

[73] Assignee: Mobil Oil Corporation, New York, N.Y.

[*] Notice: The portion of the term of this patent subsequent to Feb. 12, 2002 has been disclaimed.

[21] Appl. No.: 2,593

[22] Filed: Jan. 12, 1987

Related U.S. Application Data

[63] Continuation-in-part of Ser. No. 816,655, Jan. 6, 1986, abandoned, which is a continuation-in-part of Ser. No. 690,545, Jan. 11, 1985, Pat. No. 4,649,032, which is a continuation-in-part of Ser. No. 361,947, Mar. 25, 1982, abandoned, which is a continuation-in-part of Ser. No. 336,796, Jan. 4, 1982, abandoned.

[51] Int. Cl.$^4$ .............. B01D 53/18; B01D 53/34; C01B 17/05
[52] U.S. Cl. .............. 423/220; 423/224; 423/226; 423/233; 423/573.1; 423/576.5; 423/576.6; 423/DIG. 9
[58] Field of Search .............. 423/220, 224, 226, 233, 423/571, 573 R, 230, DIG. 9, 573.1, 576.5, 576.6

[56] References Cited

U.S. PATENT DOCUMENTS

| | | | |
|---|---|---|---|
| 4,009,251 | 2/1977 | Meuly | 423/573 G |
| 4,283,379 | 8/1981 | Fenton et al. | 423/573 R |
| 4,388,293 | 6/1983 | Diaz | 423/226 |
| 4,499,059 | 2/1985 | Jones et al. | 423/226 |
| 4,649,032 | 3/1987 | Snavely, Jr. et al. | 423/226 |
| 4,774,071 | 9/1988 | Jeffrey et al. | 423/576.6 |

FOREIGN PATENT DOCUMENTS 0086919  8/1983  European Pat. Off. ............ 423/226

OTHER PUBLICATIONS

U.S. application No. 614,009, 6/10/87, Jones et al.
U.S. application No. 614,010, 5/25/84, Jones et al.

Primary Examiner—John Doll
Assistant Examiner—Jeffrey Edwin Russel
Attorney, Agent, or Firm—Alexander J. McKillop; Charles J. Speciale; Stanislaus Aksman

[57] ABSTRACT

A process for oxidizing a metal from a lower valence state to a higher valence state comprises contacting the metal, usually contained in a solution, with a sufficient amount of an oxygen-containing gas to provide at least about 300% excess of stoichiometric oxygen with respect to the metal at the lower valence state. The metals are preferably used as chelated solutions thereof. Some of the representative metals are iron, copper, manganese, lead or mercury.

16 Claims, 3 Drawing Sheets

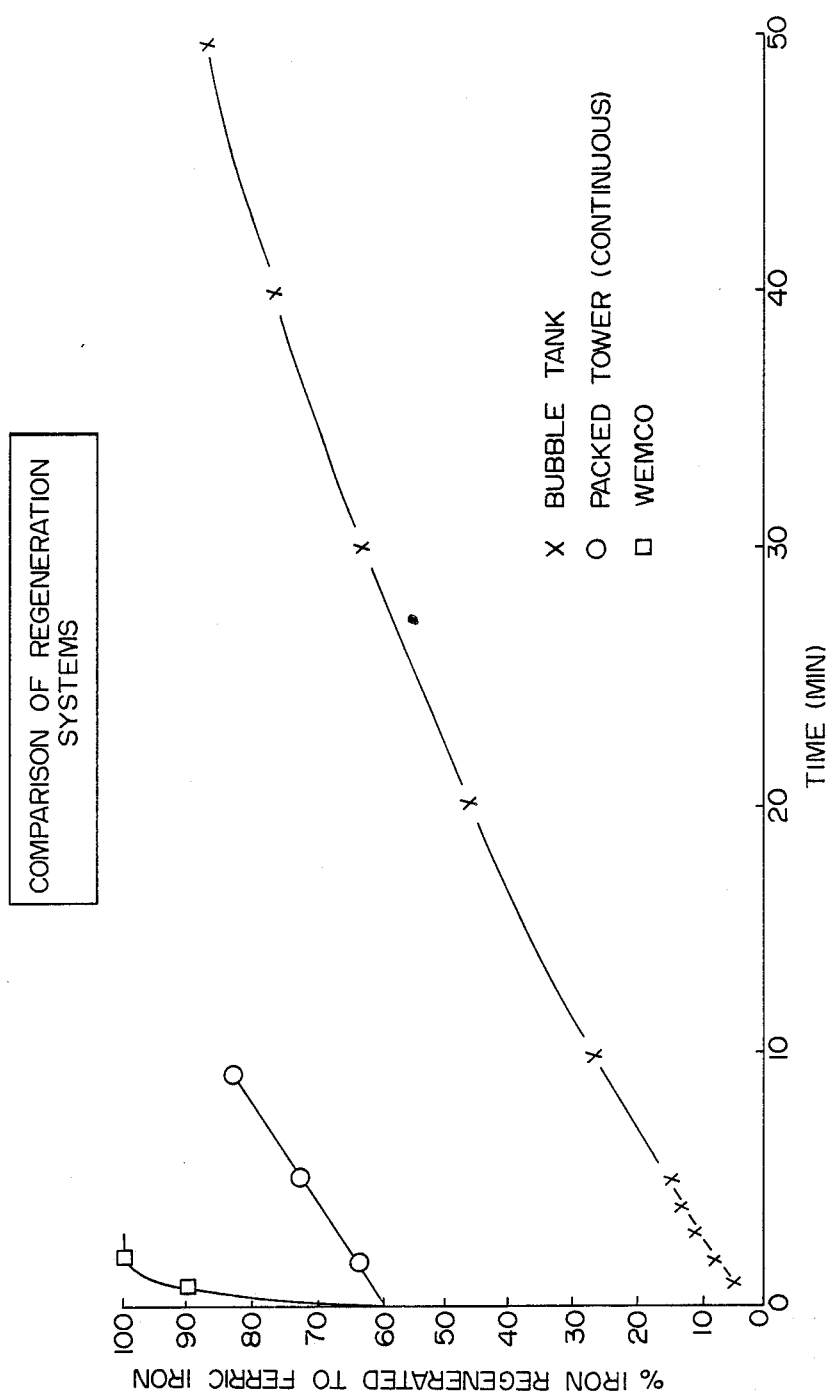

PROCESS FOR OXIDIZING MULTIVALENT METALS

CROSS-REFERENCE TO RELATED APPLICATIONS

This application is a continuation-in-part of U.S. application, Ser. No. 816,655, filed on Jan. 6, 1986, now abandoned, which was a continuation-in-part of U.S. application, Ser. No. 690,545, filed on Jan. 11, 1985, now U.S. Pat. No. 4,649,032, which was a continuation-in-part of U.S. application, Ser. No. 361,947, filed Mar. 25, 1982, now abandoned, which in turn was a continuation-in-part of U.S. application, Ser. No. 336,796, filed Jan. 4, 1982, now abandoned, the entire contents of all of which are incorporated herein by reference.

BACKGROUND OF THE INVENTION

1. Field of the Invention

The present invention relates to a process for the oxidation of a metal from a lower to a higher valence state. More particularly, the present invention provides a process for the oxidation of the metal in a particular type of aeration flotation apparatus.

2. Description of the Prior Art

There are a number of chemical processes requiring efficient and economical methods of oxidizing multivalent metals and compounds thereof from lower to higher valence states. One of such processes involves the regeneration of a metal, such as an iron chelate solution used in the process of removing hydrogen sulfide from gases, e.g., see EPA No. 82.306861.4, filed Dec. 22, 1982, published on Aug. 31, 1983.

The removal of hydrogen sulfide from gaseous streams, such as the waste gases liberated in the course of various chemical and industrial processes, for example, in the pulping of wood, natural gas and crude oil production and in petroleum refining, has become increasingly important in combating atmospheric pollution. Hydrogen sulfide-containing gases not only have an offensive odor, but such gases may cause damage to vegetation, painted surfaces and wildlife, as well as constitute a significant health hazard to humans. Government regulations have increasingly imposed continuously lower tolerances on the content of hydrogen sulfide which can be vented to the atmosphere, and it is now imperative in many localities to remove virtually all of the hydrogen sulfide under the penalty of an absolute ban an continuing operation of commercial plants which produce the hydrogen sulfide-containing gaseous streams.

The quantities of hydrogen sulfide in process gas streams are normally not very high. U.S. Pat. No. 3,071,433, dated Jan. 1, 1964 to Dunn, indicates that the stack gases obtained in the concentration of blank liquor, the waste pulping liquor of the Kraft pulping process, contain from 500 to 2000 parts per million (ppm) of hydrogen sulfide. However, the odor of hydrogen sulfide can be detected by humans at a concentration of approximately 0.01 ppm. Consequently, an extremely efficient process for the removal of hydrogen sulfide is required to eliminate small amounts of noxious hydrogen sulfide from process gases.

Carbon dioxide may also be present with hydrogen sulfide as a contaminant of various gases, e.g., those obtained from well casings, combustion floods, geothermal steam, or tank vapors. Often, it is not only desirable to remove $H_2S$ from such gases, but to selectively remove $H_2S$ and not remove the carbon dioxide.

One well known method in the art for removing hydrogen sulfide from a gas stream involves contacting the gas stream with caustic soda, which scrubs the acid gases from the gas stream. U.S. Pat. No. 2,747,962 to Heitz et al provides a method whereby acid gases, such as hydrogen sulfide, are removed selectively from a gas stream also containing carbon dioxide using an alkaline liquid, such as caustic soda, to remove the acid gases. The absorption of the $CO_2$ is much slower than the absorption of $H_2S$, and thus the absorption of $CO_2$ can be prevented by maintaining a very short contact time (0.01–0.02 second) between the gas stream and alkaline liquid. However, a disadvantage of this process is that when the alkaline liquid is regenerated by heating to about 270° F., $H_2S$ is produced, and thus the $H_2S$ disposal problem is not solved but merely postponed. Alternatively, a relatively toxic sodium sulfide solution must be disposed of.

It is also known to effect the removal of hydrogen sulfide in an oxidation-reduction system by contacting the hydrogen sulfide-containing gas stream with a solution of a polyvalent cation (such as iron) complexed with a chelating agent (such as ethylenediaminetetraacetic acid or sodium salt thereof). In such a process, iron in the ferric state oxidizes the hydrogen sulfide to sulfur, the iron is reduced to the ferrous state, and the solution is regenerated by aeration to convert the iron back to the ferric state. The sulfur is recovered from the solution by froth flotation.

For example, U.S. Pat. No. 4,036,942 to Sibeud et al discloses a process for removing hydrogen sulfide and alkyl mercaptans from fluid streams by reacting the fluid streams with oxygen in the presence of a metal amino acid chelate in an aqueous solution containing an amine, resulting in the conversion of hydrogen sulfide to sulfur and alkyl mercaptans to dialkyldisulfides, and separating these from the aqueous metal chelate solution. However, the presence of oxygen in the reactants is disadvantageous in that it results in the conversion of some of the sulfur to sulfates and thiosulfates. Furthermore, the reaction requires a relatively long contact time between the metal chelate solution and the hydrogen sulfide-containing gas stream, such that if carbon dioxide is also present in the gas stream, the required contact time results in the absorption of carbon dioxide into the reaction solution, thus lowering the pH and lowering the efficiency of the reaction.

U.S. Pat. No. 4,009,251 to Meuly also discloses a process for removing hydrogen sulfide and alkyl mercaptans from gaseous streams by oxidizing the hydrogen sulfide to sulfur substantially without the formation of sulfur oxides, in the presence of a metal chelate catalyst solution and a soluble alkali metal, or alkaline earth metal or ammonium or amine salt of an acid having a pK within the range of about 1.2 to about 6. The spent metal chelate catalyst solution is then regenerated with oxygen. The alkyl mercaptans are oxidized to dialkyldisulfides under the same conditions. Meuly attempts to eliminate the oxidation of hydrogen sulfide through to sulfur oxides by the addition of the above-described acid salts. Such addition to the metal chelate catalyst solution is required, since Meuly reacts the hydrogen sulfide-containing gas stream with oxygen and recognizes that sulfur oxides may be formed by such a reaction mixture. Furthermore, the process of the above patent requires relatively long contact times for oxidation, and thus when carbon dioxide is present in the hydrogen sulfide-containing gas stream, the relatively contact time also results in the absorption of $CO_2$ and the consequential reduction in the pH of the solution and reduction in the efficiency of the system.

In many other industrial/chemical processes it is important to oxidize a multi-valent metal from a lower to a higher valence state by contacting the solution thereof with an oxygen-containing gas.

SUMMARY OF THE INVENTION

The present invention provides a process for oxidizing a multi-valent metal from a lower valence state to a higher valence state comprising contacting a liquid containing the metal at the lower valence state with a sufficient amount of an oxygen-containing gas to provide at least about 300% excess of stoichiometric oxygen ($O_2$) with respect to the metal at the lower valence state. The process is preferably conducted in a conventional froth flotation apparatus previously used for separating oil from water.

BRIEF DESCRIPTION OF THE DRAWINGS

FIG. 3 is a graph illustrating the efficiency of regenerating the reduced metal chelate used to recover $H_2S$ from gases in different regeneration systems.

DESCRIPTION OF THE PREFERRED EMBODIMENTS

Figure 1:
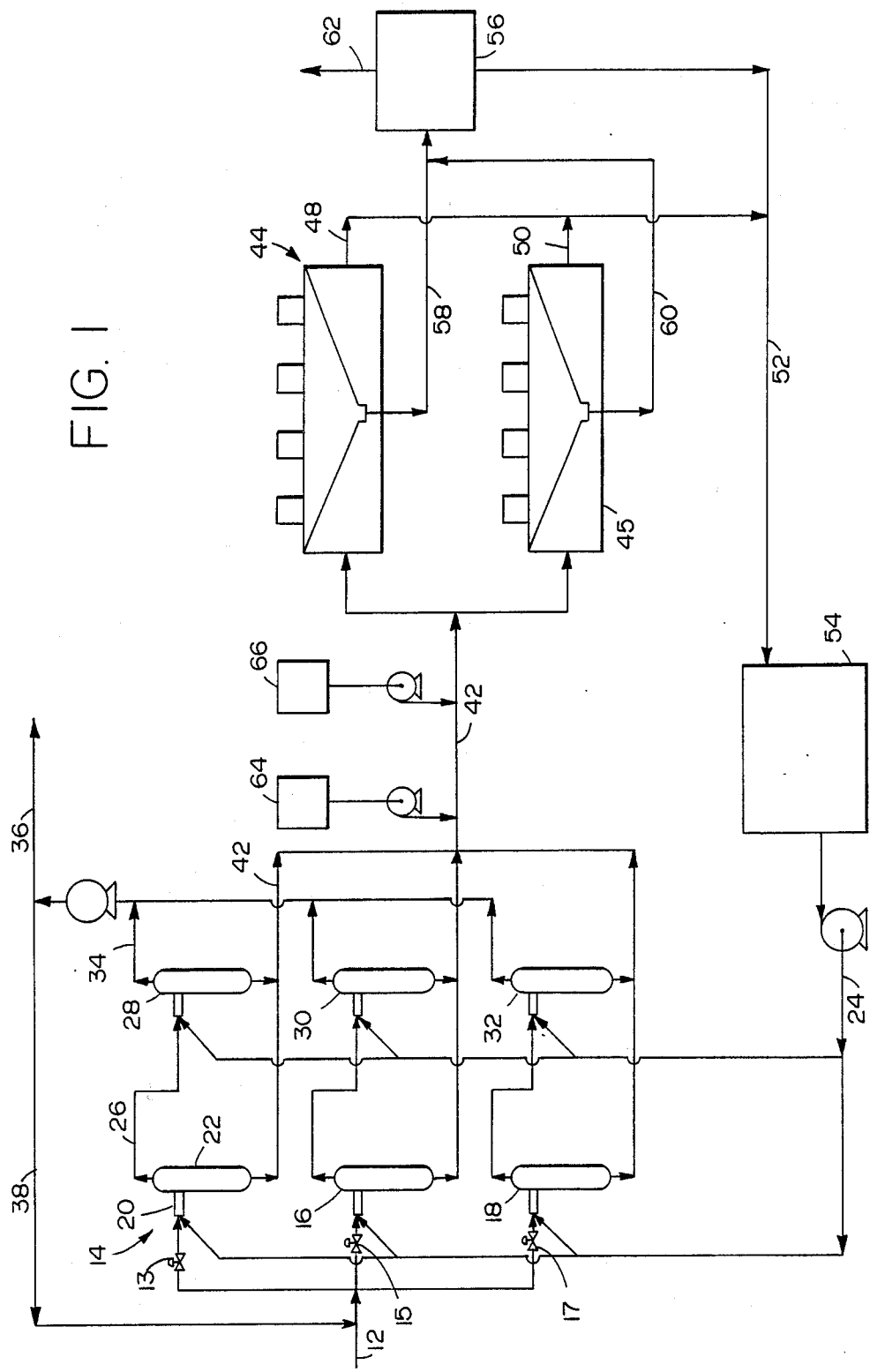
FIG. 1 is a schematic diagram of one of the processes capable of utilizing the present invention in the regeneration stage of such a process.

Any polyvalent metal that exists in more than one oxidation state can be used in the process of the invention. Suitable metals are iron, copper, manganese, lead, mercury, palladium, platinum, tungsten, nickel, chromium, cobalt, vanadium, titanium, tantalum, zirconium, molybdenum and tin, preferably iron, copper, and manganese, and most preferably iron. The polyvalent metal is preferably used as a polyvalent metal chelate solution.

The polyvalent metal chelate solutions employed in the process of the invention are coordination complexes in which the polyvalent metals form chelates with amino acids having one of the following general formulae:

$$(A)_{3-n}-N-(X)_n \quad (I)$$

wherein
n is a number from 1 to 3;
X is selected from the class consisting of acetic and propionic acid groups;
A is 2-hydroxy ethyl, 2-hydroxy propyl, or an alkyl group having from 1 to about 4 carbon atoms; or

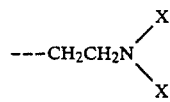

wherein from two to four of the groups X are selected from the class consisting of acetic and propionic acid groups; from zero to two of the groups X are selected from the class consisting of 2-hydroxy ethyl, 2-hydroxy propyl, and

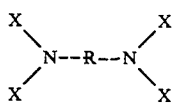

R is ethylene, propylene or isopropylene or, alternatively, cyclohexane or benzene, where the two hydrogen atoms replaced by nitrogen are in the 1,2-position.

In the most preferred embodiment an iron chelate solution is used to remove hydrogen sulfide from a gaseous stream, and then the spent chelate solution is regenerated in the process of this invention with oxygen. In this embodiment, the iron chelate solution should be capable of oxidizing hydrogen sulfide, while being reduced itself from a higher to a lower valence state, and should then be oxidizable by oxygen from the lower valence state to the higher valence state, in a typical redox reaction.

The polyvalent metal chelates are readily formed in aqueous solutions by the reaction of an appropriate salt, oxide or hydroxide of the polyvalent metal and chelating agent in the acid form or an alkali metal or ammonium salt thereof. Exemplary chelating agents include: amino acetic acids derived from ammonia or 2 hydroxy alkylamines, such as glycine, diglycine (amino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic derivatives of cyclic 1,2-diamines, such as 1,2-diamino cyclohexane-N, N-tetraacetic acid, and the amides of polyamino acetic acids disclosed in U.S. Pat. No. 3,580,950 to Bersworth, the entire contents of which are incorporated herein by reference.

The multi-valent metals are efficiently oxidized from a lower to a higher valence state if they are contacted with an oxygen-containing gas under such conditions that at least about 300%, preferably at least about 1000%, yet more preferably about 1000% to about 2000%, and most preferably about 1300% to about 1400%, or, in one particular embodiment, about 1100% excess of stoichiometric oxygen ($O_2$) with respect to the metal at the lower valence state is used to contact the metal. In this respect, the term "excess of stoichiometric oxygen", is used to designate the amount of oxygen equivalents, which is in excess of that stoichiometrically required to oxidize each equivalent of the reduced metal present in the solution of the metal in a liquid. It will be apparent to those skilled in the art that either a single metal or any mixture thereof can be used in the process of the invention. The metal or metals are preferably in a solution thereof with a suitable solvent or solvents, and such a solution is contacted with the oxygen-containing gas in a suitable apparatus. Any apparatus capable of providing the aforementioned stoichiometric excess of oxygen and intimate contact between the oxygen and the metal can be used in this invention. Suitable devices of this type include any flotation cell device capable of providing intimate contact between the metal solution and oxygen or oxygen-containing gas. Suitable devices of this type are those disclosed by Perry and Chilton, *Chemical Engineer's Handbook*, McGraw-Hill, Inc., New York, 5th Edition (1973), Section 21, pages 65-69, the entire contents of which are incorporated herein by reference. The excess oxygen may be supplied by the flotation cell device ityself, similarly to the WEMCO cell, discussed below, or it may be supplied to the flotation cell device by any suitable device, e.g., compressors or blowers, or any other similar devices, as also described by Perry and Chilton, *Chemical Engineer's Handbook*, cited above, Section 6, pages 15-36, the entire contents of which are also incorporated herein by reference. The most preferred apparatus used in the process of the invention is the apparatus known as the WEMCO flotation cell, described in detail below and in U.S. Pat. No. 3,491,880 to Reck and to Bailey, U.S. Pat. No. 3,647,069, the entire contents of both of which are incorporated herein by reference.

Figure 2:
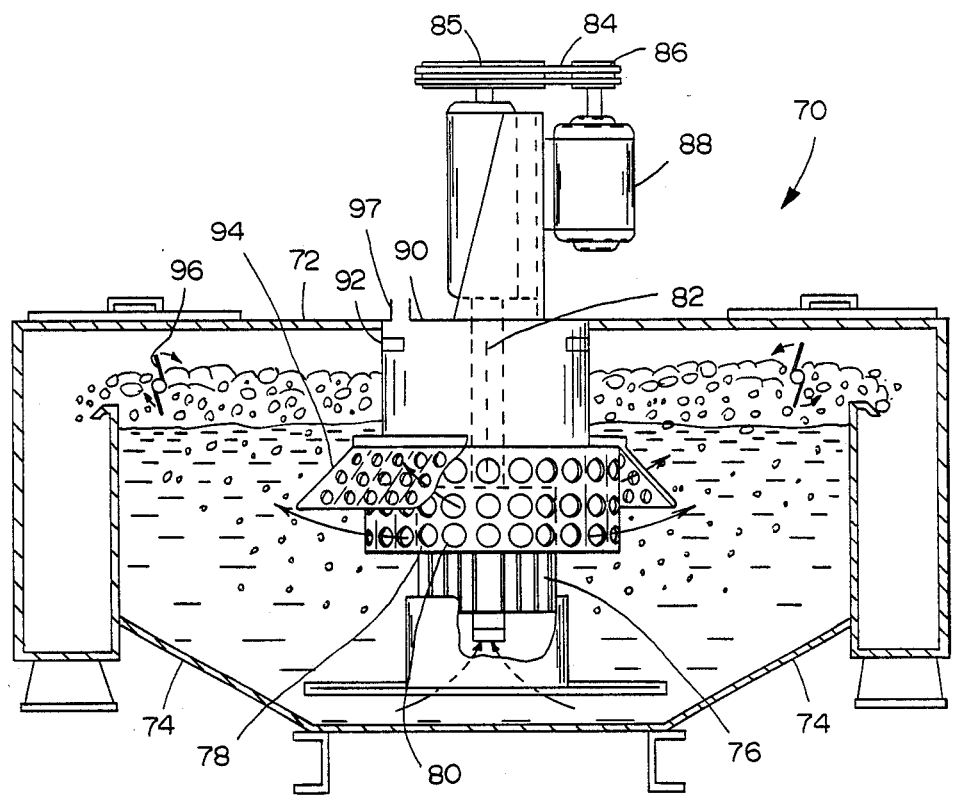
FIG. 2 is a cross-sectional view of the froth flotation apparatus utilized to recover the sulfur particles and regenerate the reduced metal chelate solution in one exemplary application of the invention.

One example of a WEMCO flotation cell 70 is schematically depicted in FIG. 2. This flotation cell, known as WEMCO Type 76, was modified by providing an additional air intake 97, not present in conventional commercially-available flotation cells of this type, to specifically adapt it to the process of this invention. The air intake 97 provides a source of fresh air into the closed cell 70, necessary for oxidizing the metal within the cell. In one exemplary embodiment, the air intake is a 4 inch diameter circular opening. The cell 70 comprises a tank 72, which includes inwardly inclined lower sidewall portions 74.

Each cell 70 includes a rotor 76 and a disperser 78 surrounding at least the upper portion of the rotor and circumferentially spaced from rotor 76. Disperser 78 contains a plurality of fluid passage openings 80 uniformly spaced along substantially the entire circumferential surface of disperser 78. Rotor 76 is fixed to the bottom of a shaft 82 and is supported a substantial distance above the bottom wall of tank 72 for rotation about an upright, and preferably substantially vertical, axis. Rotor 76 is positively rotated through belts 84 and pulleys 85 and 86 by a motor 88. Motor 88 is supported above the top of tank 72. A stand pipe 90 surrounds shaft 82 and forms a conduit for air from above the liquid level in tank 72 or the outside for oxygen supply 97 to the interior of tank 72 at the vicinity of rotor 76. Two air intakes 92 and 97 are provided, in stand pipe 90 and in the top of the apparatus, respectively. Secured to the upper edge of disperser 78 is a downwardly outwardly flaring perforated disperser hood 94.

A metal solution is introduced into tank 72 of cell 70. As rotor 76 spins, the rotating motion forms a vortex and forces water through fluid openings 80 of disperser 78, thereby creating a vacuum in stand pipe 90. The vacuum draws air through air intake 97 and, optionally 92, down stand pipe 90 for dispersion in the solution and thoroughly mixes the gas with the solution. Excess gases, e.g., excess air and impurities, are withdrawn from the apparatus through a suitable exit vent, not shown in FIG. 2. As the gas-liquid mixture travels through disperser 78 at high velocities, a shearing force is created, causing the gas to form minute bubbles. The air bubbles float through the solution in an upward direction.

The WEMCO 76 cell shown in FIG. 2 must be operated at 200 to 600, preferably 250 to 400, and most preferably 300 to 350 revolutions per minute (rpm) to provide a sufficient excess of oxygen to contact the metal or metals for the purposes of this invention and to obtain the needed efficient mixing to obtain the good mass transfer needed to oxidize the solution. Without wishing to be bound by any theory of operability, it is believed that the WEMCO flotation cell is extremely useful in the process of the invention because it is capable of providing intimate contact between the oxygen and the metal due to the high rate of revolutions of its rotor and its internal design and to the shearing action of the disperser. In this connection, the number and size of the openings 80 of the disperser 78 are thought to be important in the present invention. Without wishing to be bound by any theory of operability, it is believed that the design of the rotor 76 and the disperser 78, including the disperser hood 94 thereof, as disclosed in the aforementioned patents of Reck and Bailey, are important in providing the necessary intimate contact between the oxygen and the metal solution and the excess oxygen necessary for efficient and effective oxidation of the metal.

The pH of the liquid containing the metal should be within the range of from about 7 to about 11, preferably about 8 to about 10, and most preferably about 8 to about 9. The upper limit is present only because the metal chelate solutions are not stable at pH's higher than 11. However, if a metal chelate could be found to be stable at a pH higher than 11, such a metal chelate may be used. If the chelate solution is acidic in the initial makeup or as a result of side reactions, it is necessary to buffer the solution by adjusting the pH to within the appropriate range by the addition of an alkali metal hydroxide, for example, sodium hydroxide, an alkali metal or ammonium carbonate or bicarbonate or ammonium hydroxide.

The process of the present invention can be practiced with any multi-valent metal, usually contained in a liquid solution thereof. For purposes of illustration and simplification it will be described below in conjunction with a process of removing hydrogen sulfide from a gaseous stream. However, it will be apparent to those skilled in the art that the invention is not limited to this particular embodiment and that it can be utilized in any process requiring the oxidation of a metal from a lower to a higher valence state.

Any gaseous stream containing hyrogen sulfide in any concentration, even in very low concentrations of the order of a few parts per million may be used in the most preferred embodiment of the process. This embodiment is particularly useful when carbon dioxide is also present, even at high levels (greater than 75% weight), in the gaseous stream containing hydrogen sulfide. Examples of gaseous streams which contain hydrogen sulfide and carbon dioxide include sour gases and waste gases from petroleum refining, shale oil and tar sands processing, coal gasification, gases recovered during crude oil and natural gas production, stack gases from cellulose pulping processes, gaseous effluents from sewage disposal plants, tail gases from Claus Process units, and hydrogen sulfide waste gases from other chemical and industrial processes.

The following equations illustrate the process reactions when an iron chelate is used as the catalyst to convert the hydrogen sulfide to elemental sulfur.

Absorption: $H_2S + 2OH^- \rightarrow S^{--} + 2H_2O$

Oxidation: $2[Fe(X)]^{+++} + S^{--} \rightarrow S^o + 2[Fe(X)]^{++}$

Regeneration: $2[Fe(X)]^{++} + \frac{1}{2} O_2 + 2H^+ \rightarrow 2[Fe(X)]^{+++} + H_2O$ Overall net reaction: $H_2S + \frac{1}{2} O_2 \rightarrow S^o + H_2O$ where X is the chelating agent.

Any other chelate of any other multi-valent metal, exemplified above may be used instead of the iron chelate solution used in the above illustration. The metal chelate solution is contacted with a gas containing hydrogen sulfide in any known suitable apparatus, such as a static mixer described in the above-identified previously-filed U.S. patent applications. The spent chelate solution is then regenerated in a regeneration apparatus in accordance with the process of this invention.

In the regeneration stage of the process of the preferred embodiment of the invention, the iron which has been reduced during the oxidation of hydrogen sulfide to sulfur is regenerated (oxidized) to the higher oxidation state, and the sulfur particles which are suspended in the slurry are separated by froth flotation. The chelated iron contained in the liquid entering tanks 44 and 46 (FIG. 1) from stream 42 is approximately 60% by weight ferric ironchelate and 40% by weight ferrous iron chelate. Tanks 44 and 46 comprise a plurality of flotation cells, preferably "WEMCO" cells sold by Envirotech Corporation, described in detail above. In each cell, an oxygen-containing gas, such as air, is carried into the liquid by a vacuum formed during the movement of a rotor within the body of liquid. The oxygen containing gas is dispersed in minute bubbles, which carry the suspended sulfur to the top of each cell and which oxidize the reduced iron. The regenerated solution is piped via streams 48 and 50 from tanks 44 and 46, respectively, to a surge tank 54 via line 52. The regenerated solution is pumped back to the static mixer-separator trains via line 24.

The sulfur and residual metal chelate solution from tanks 44 and 46 is piped to a sulfur melting system 56 via lines 58 and 60. The molten sulfur is removed through a line 62 and any remaining iron chelate solution is piped back to the surge tank 54 via line 52. Iron chelate solution make-up and pH adjusting solution are stored in tanks 64 and 66 and can be pumped into the system when needed. Alternatively, a filter system could also be used to separate sulfur from the solution.

EXAMPLE 1

(REMOVAL OF H$_2$S BY IRON CHELATE SOLUTION)

The system, as shown in FIG. 1, was used to selectively remove hydrogen sulfide from the waste gas produced in an oil field. The hydrogen sulfide-containing gas stream tested had a composition of approximatey 1.2% hydrogen sulfide, 88% carbon dioxide, 5% nitrogen and 5.8% hydrocarbons, all by volume.

The hydrogen sulfide-containing gas stream was introduced into the system through a conduit 12. It was distributed to any one or any combination of three static mixer-separator trains, comprising a static mixer 20 and a liquid-gas separator 22 immediately following it. A ferric chelate solution having a pH above 7, entered each of the static mixer-separator trains 14, 16 and 18 from stream 24. No oxygen or oxygen-containing gas was introduced into the contact zone since, as is disclosed by U.S. Pat. No. 4,009,251 to Meuly, the presence of oxygen in the contact zone tends to oxidize the hydrogen sulfide to sulfur oxides, the formation of which is detrimental to the efficiency of the present invention. The contact time between the gas and liquid phases in each static mixer 20 was less than 0.1 second, preferably between about 10 and about 80 milliseconds (ms) and most preferably about 10 to about 30 ms. The contact time was controlled by controlling the flow rate of the gas and liquid streams into the individual static mixers 20, which had fixed lengths and internal diameters. In the contact zone of the static mixer 20, the hydrogen sulfide in the inlet gas was oxidized instantaneously to elemental sulfur by the iron chelate solution. The sulfur solids precipitated as a slurry in the treating solution. The off gas stream 26, taken from overhead of each separator 22 of the individual static mixer-separator trains, was conveyed to the respective second static mixer-separator trains 28, 30 or 32. The static mixer and separator structure in each static mixer-separator train 28, 30 and 32 was similar to the static mixer 20 and separator 22 structure in the first static mixer-separator train 14, 16 and 18. The gas from stream 26 was contacted with metal chelate solution from stream 24 in each second mixer-separator train, preferably for about 10 to 80 milliseconds. The off gas, taken from overhead of each separator in static mixer-separator train 28, 30, and 32, left the individual separator at stream 34 which was introduced into conduit 36, which conveyed the off gas to a compressor and then to an incinerator or for recycle. Stream 38 was a bypass stream which fed the off gas to feed stream 12 if extra feed gas was needed to obtain the required residence time in the static mixtures.

Often, feed gas stream 12 was not of the correct volume flow rate to provide the desired residence time in the static mixers for selective H$_2$S removal. The parallel static mixers 14, 16 and 18 were used to divide the feed stream and provide the required gas flow through each mixer. Valves 13, 15 and 17 allowed control of the feed gas into the desired static mixer.

The liquid containing the reduced metal ion and sulfur solids from each of the separators 22 in the first and second static mixer-separator trains was piped to stream 42 which was conducted to a pair of WEMCO flotation devices 44 and 46, which are generally referred to as the regeneration stage of the process.

Absorption efficiencies of H$_2$S with this commercial size unit ranged between 90 and 98%. The WEMCO flotation devices 44 and 46 in this example always regenerated the solution efficiently and completely.

EXAMPLE 2

(OXIDATION PROCESS)

In the contact zone of the static mixer, the hydrogen sulfide in the inlet gas is oxidized to elemental sulfur by the iron chelate solution, as described above, and sulfur solids are formed as a slurry in the treating solution. The reduced iron chelate solution containing the sulfur solids is pumped into a regeneration station, where the chelate is regenerated (oxidized to the higher valency state) by bubbling oxygen or any oxygen containing gas through the solution. Air is the preferred oxygen-containing gas.

The preferred regeneration apparatus used in this step is a commercial flotation cell marketed under the trade name WEMCO. Such apparatus has been used in the past to separate oil from oil and water mixtures. We found that the WEMCO flotation cell acts very efficiently as a reactor for oxidizing a metal from a lower to a higher valence state in gas-liquid phase chemical reactions and is further capable of separating any solids which may be present before or after completion of the reaction. Thus, the preferred regeneration apparatus, depicted in FIG. 1 as tanks 44 and 46, consists of several flotation cells, the details of one of which are shown in FIG. 2. The apparatus shown in FIG. 2 is generally indicated by reference 70. Each tank 44 or 46 comprises four such flotation cells 70.

Ferrous iron chelate solution containing the suspended sulfur particles is introduced into tank 72 of cell 70. As rotor 76 spins, the rotating motion forms a vortex and forces water through fluid openings 80 of dispenser 78 and thus creates a vacuum in stand pipe 90. The vacuum draws air through air intake 97 and optionally 92 down stand pipe 90 for dispersion in the iron chelate solution and thoroughly mixes the air with the solution. As the gas-liquid mixture travels through the disperser 78 at high velocities, a shearing force is created, causing the gas to form minute bubbles. As the air bubbles float through the metal chelate solution, the bubbles carry with them the sulfur particles to the surface of cell 70. Skimmer paddles 96 remove the sulfur particles concentrated at the surface of the metal chelate solution. Additionally, the air, or any other oxygen-containing gas, oxidizes the ferrous ion to the ferric ion to regenerate the iron chelate, which can be recycled and conveyed to the static mixers for hydrogen sulfide oxidation.

We found that the WEMCO flotation cell is highly efficient in oxidizing the ferrous chelate iron to the ferric chelate. In FIG. 3, the time needed to regenerate substantially all of the ferrous iron chelate is illustrated for three types of regeneration systems, i.e., bubble tank, packed tower and the WEMCO flotation cell. The bench scale WEMCO cell was operated at 1200 rpms and air was the oxygen containing gas which was dispersed in the solution. The amount of air used in the regeneration step was calculated to be equivalent to 300% excess of stoichiometric oxygen. As can be seen in FIG. 3, the WEMCO flotation apparatus regenerated the ferrous iron chelate solution in 1 to 2 minutes, while the bubble tank, operated at 2300% excess of stoichiometric oxygen, took 50 minutes to regenerate 87% of the total iron to the ferric ion. Normal field applications would regenerate the solution from the 40% ferrous state. The packed column test was operated as a flowing system, while various regeneration times were achieved by varying the liquid hold-up in the column. The inlet ferrous percentage for the packed column was maintained at 40%. With a 10 minute hold-up time, the packed column regenerated 70% of the ferrous ions to the ferric state.

The WEMCO flotation cell operated with the highest regeneration efficiency and has definite advantages over the other tested oxidation systems. The WEMCO flotation cell does not require air blowers because the air is dispersed in the solution due to the low pressure vortex created in the stand-pipe by the rotation of the rotor. The low pressure vortex creates a vacuum and draws air into the flotation cell. Furthermore, when the WEMCO flotation cell is used to regenerate an iron chelate solution previously utilized to remove hydrogen sulfide from a gas, as described in this example, the sulfur is concentrated by a frothing action, therefore reducing the solution inventory to be filtered. The quick regeneration time also allows low plant solutions inventory (e.g., 10,000 gal. for the WEMCO apparatus compared to 100,000 gal. if bubble tanks are used instead of the Wemco apparatus.) We found in this particular application that the induced gas flow into the liquid and the shearing action of the gas-liquid mixture through the disperser yield a higher efficiency of regeneration of the reduced metal chelate. Aerators which induce a flow of air through a liquid without the gas-liquid shearing action of the WEMCO may not be as efficient in regenerating the reduced metal chelate. An example of such an aerator for oxidizing hydrogen sulfide in a liquid is described in U.S. Pat. No. 4,309,285 issued Jan. 5, 1982.

As stated in reference to FIG. 2, the sulfur is recovered from the surface of the solution in each of the flotation cells 70 which make up tanks 44 and 46. The sulfur particles and residual metal chelate solution are then subjected to heat treatment at about 270° F. to melt the sulfur. It is advantageous to use an excess of a chelating agent, particularly when the metal is iron chelated with HEDTA. We found that a 6% or more molar excess of a chelating agent maintains the iron in stable solution during gas-liquid contact, regeneration, and sulfur melting steps such that there is no appreciable iron precipitation as hydroxide. The loss of iron is thus prevented. When HEDTA is used as the chelating agent, a 6% molar excess is needed when the regenerated chelate solution is at a pH of about 8.8. Since the increase in pH renders the iron chelate solution less stable, it is believed that a large excess is needed as the pH is increased. The amount of excess is dependent upon the chelating agent which is used and, accordingly, other iron chelates may need more or less excess of chelate to keep the iron stable under the operating conditions. The molten sulfur has a density of about 2.0 g/cc, which is substantially higher than the residual metal chelate solution and, accordingly, the molten sulfur is collected at the bottom of the heating vessel. The sulfur recovered is of high purity and may be recovered directly from the vessel and sold as such. Other separation systems, such as filters or centrifuges, can be used.

As illustrated in this example, the present invention can be used as the regeneration step in a process of selectively removing hydrogen sulfide from a gaseous stream additionally containing carbon dioxide.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A process for oxidizing a metal from a lower to a higher valence state comprising:
   (a) introducing an aqueous solution of the metal at the lower valence state, the solution further comprising a dispersed solid phase, into an oxidizing zone;
   (b) forming a relatively low pressure area below the surface of the solution by rotating a rotating means below the surface of the solution;
   (c) providing a communication means between the relatively low pressure area and a supply of an oxygen-containing gas, thereby introducing into the low pressure area and dispersing within the solution so much of the gas as to provide at least about 300% excess of stoichiometric oxygen ($O_2$) with respect to the metal at the lower valence state, the pressure in the relatively low pressure area being sufficient to draw the oxygen-containing gas into the oxidizing zone; and, (d) subjecting the solution and the thus-obtained dispersed gas to a sufficient shearing force to finely divide the gas into bubbles within the solution.

2. A process of claim 1 wherein the metal is iron, copper, manganese, lead, mercury, palladium, platinum, tungsten, nickel, chromium, cobalt, vanadium, titanium, tantalum, zirconium, molybdenum or tin.

3. A process of claim 2 wherein the metal of the lower valence state is in the form of a polyvalent metal chelate.

4. A process of claim 3 wherein said chelate is selected from the group consisting of ethylenediaminetetraacetic acid and N-hydroxyl-ethyl-ethylenediaminetriaacetic acid.

5. A process of claim 4 wherein the metal is iron.

6. A process of claim 5 wherein the iron is oxidized from ferrous iron ($Fe^{2+}$) to ferric iron ($Fe^{3+}$).

7. A process of claim 6, wherein the oxidizing zone pH is maintained at about 7 to about 11.

8. A process of claim 7 wherein the dispersed solid phase is carried to the surface of the solution with the oxygen-containing gas.

9. A process of claim 8, wherein the solution and the dispersed gas are subjected to the shearing force by passing the solution and the gas through a series of relatively small openings of a disperser means circumferentially surrounding and spaced from the rotating means.

10. A process of claim 9, wherein the communication means comprises a conduit connecting the supply of the oxygen-containing gas with the vicinity of the rotating means.

11. A process of claim 10, wherein the oxygen-containing gas is ambient air.

12. A process of claim 11, wherein the dispersed solid phase is sulfur.

13. A process of claim 12 wherein the metal is oxidized within about 1 to about 2 minutes.

14. A process of claim 13 wherein the rotating means is placed inside of a vertical standpipe means communicating through said conduit with the ambient air at the top thereof and with the aqueous solution at the bottom thereof.

15. A process of claim 14 wherein the rotating means creates a vacuum in the vertical standpipe means.

16. A process of claim 1 wherein a sufficient amount of the gas is dispersed within the solution to provide 300% excess of stoichiometric $O_2$ with respect to the metal at the lower valence state.

* * * * *